(12) United States Patent
Pschierer et al.

(10) Patent No.: US 8,704,701 B2
(45) Date of Patent: Apr. 22, 2014

(54) AUTOMATIC MONITORING OF FLIGHT RELATED RADIO COMMUNICATIONS

(75) Inventors: Karl Christian Pschierer, Ochsenfurt (DE); Marco Gaertner, Sinntal-Sannerz (DE); Joshua Nicholas Smith, Vail, CO (US)

(73) Assignee: The Boeing Company, Chicago, IL (US)

( * ) Notice: Subject to any disclaimer, the term of this patent is extended or adjusted under 35 U.S.C. 154(b) by 235 days.

(21) Appl. No.: 13/275,774

(22) Filed: Oct. 18, 2011

(65) Prior Publication Data
US 2013/0093612 A1 Apr. 18, 2013

(51) Int. Cl.
*G01S 13/93* (2006.01)
*G01S 7/22* (2006.01)
*G08G 5/00* (2006.01)

(52) U.S. Cl.
CPC ............... *G01S 13/9303* (2013.01); *G01S 7/22* (2013.01); *G08G 5/0008* (2013.01)
USPC ............................................. 342/36; 342/182

(58) Field of Classification Search
CPC ....... G01S 13/9303; G01S 13/91; G01S 7/22; G08G 5/0013; G08G 5/0008; G08G 5/0021; G08G 5/0078; G08G 5/04
USPC ..................... 342/29–38, 176–182
See application file for complete search history.

(56) References Cited

U.S. PATENT DOCUMENTS

| 6,160,497 | A | 12/2000 | Clark | |
|---|---|---|---|---|
| 7,912,592 | B2 * | 3/2011 | Komer et al. | 701/3 |
| 2007/0288129 | A1 * | 12/2007 | Komer et al. | 701/3 |
| 2008/0045198 | A1 | 2/2008 | Bhogal et al. | |
| 2010/0030400 | A1 * | 2/2010 | Komer et al. | 701/3 |
| 2010/0231705 | A1 * | 9/2010 | Yahav et al. | 348/115 |
| 2011/0291861 | A1 | 12/2011 | Meunier et al. | |
| 2013/0093612 | A1 * | 4/2013 | Pschierer et al. | 342/36 |

FOREIGN PATENT DOCUMENTS

EP 2299422 A1 3/2011

OTHER PUBLICATIONS

Ragland, Michael A., "Application of Ground/Air Data Link to General Aviation Operations," Aerospace and Electronic Systems Magazine, IEEE, vol. 2, No. 6, pp. 15,19, Jun. 1987.*
Vacek, S.; Bergmann, S.; Mohr, U.; Dillmann, R., "Fusing image features and navigation system data for augmenting guiding information displays," Multisensor Fusion and Integration for Intelligent Systems, 2006 IEEE International Conference on, vol., No., pp. 323,328, Sep. 2006.*
European Extended Search Report dated Mar. 19, 2013 in EP Application No. 12181958.5-1810.

(Continued)

*Primary Examiner* — John B Sotomayor
(74) *Attorney, Agent, or Firm* — Hope Baldauff, LLC

(57) ABSTRACT

The present disclosure is generally directed to processing air traffic controller ("ATC") communication directed to aircraft other than the current aircraft. ATC communication is processed using speech recognition and the call sign and augmented flight information for other aircraft is identified. The corresponding aircraft icon on the display representing the aircraft on the display may be augmented by emphasizing the icon and displaying augmented flight information, along with an insignia. This information is displayed for a configurable time duration, after which the display reverts to displaying a conventional aircraft icon and associated flight information on the display. The pilot can subsequently select the aircraft icon and may be presented with a log of past ATC communications for the aircraft.

19 Claims, 7 Drawing Sheets

(56) References Cited

OTHER PUBLICATIONS

"Eurofighter Technology and Performance: Cockpit" www.typhoon.starstreak.net/Eurofighter/cockpit.html accessed Oct. 18, 2011.
Wargo, C.A., "Performance of Data Link Communications in Surface Management Operations," Aerospace Conference, 2011 IEEE, Mar. 2011. Abstract only.
Wikipedia, "Traffic Collision Avoidance System," http://en.wikipedia.org/wiki/Traffic collision avoidance system accessed Oct. 18, 2011.
Wikipedia, "Transponder (aviation)," http://en.wikipedia.org/wiki/Transponder (aviation) accessed Oct. 18, 2011.

* cited by examiner

AUTOMATIC MONITORING OF FLIGHT RELATED RADIO COMMUNICATIONS

BACKGROUND

Radio communications between air traffic control ("ATC") and a commercial pilot frequently occur on a radio channel allowing a number of pilots operating in the area to hear the communications. Thus, the radio channel offers a "party-line" effect in that each pilot can monitor communications between ATC and pilots of surrounding aircraft.

Because all the pilots in a receiving area receive all communications, a mechanism has been defined to uniquely identify an aircraft. ATC communication is often directed to an aircraft by using a call sign. For commercial aircraft, the call sign may consist of a designator, which is the name of the aircraft operating agency, followed by a number, which is often the flight identification number. Thus, for example, a British Airways aircraft may be designated by the name "Speedbird." If the flight number were, e.g., 123, then the call sign could be "Speedbird 123." In other embodiments, the number may be different from the flight number. Commercial pilots are attuned to recognizing the call sign for their aircraft. The call sign for an aircraft may change from one flight to another because the flight number may change.

The flight number of the aircraft typically has a different designation, and the alphanumeric indication for the same flight may be represented as "BAW23" for British Airways Flight Number 23. Because the name of an airline may change or may sound confusingly similar to another airline in the context of voice based communications, the designation of the aircraft operator and the call sign may not be the same.

Pilots monitor ATC communication for flight instructions for not only their aircraft, but for instructions directed to surrounding aircraft. This allows pilots to maintain a situational awareness of surrounding aircraft and increase system safety. For example, by monitoring ATC communication a pilot may be aware of instructions directed to nearby aircraft instructing that aircraft to change heading. This allows the pilot to maintain awareness of where surrounding aircraft are, or on which heading they are on.

Pilots may be presented with a computer generated display of surrounding aircraft using equipment. Once such system is the cockpit display of traffic information ("CDTI") display. This display shows where aircraft are currently positioned and their respective headings. Monitoring ATC communication provides the pilot with further information that is not displayed by the CDTI. However, monitoring ATC communication can be distracting to the pilot, and can interrupt or delay a mental activity that may be critical. If the pilot instead focuses on the current task, then the ATC instructions directing another aircraft to change course may be missed by the pilot. Another system representing surrounding aircraft is the traffic collision avoidance system ("TCAS") that receives positioned information of aircraft and provides warnings of potential collisions.

It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, a method for displaying augmented flight information on a display includes receiving air traffic controller ("ATC") communication at a first aircraft regarding a second aircraft, the ATC communication including augmented flight information that includes a change to a vector of the second aircraft. The method also includes ascertaining the augmented flight information in the ATC communication for the second aircraft, and determining the second aircraft is not the first aircraft receiving the ATC communication. The method also includes displaying in response to determining the second aircraft is not the first aircraft at least a part of the augmented flight information on the display along with a visual indication identifying the second aircraft is a target aircraft of the ATC communication.

In another embodiment disclosed herein, a system for displaying augmented flight information includes a radio receiver configured to receive wirelessly communicated air traffic control communication in an aircraft, the radio receiver providing voice-based ATC communication signals. The system also includes a speech processing module configured to receive the voice-based ATC communication signals and providing call sign data indicating a call sign for other aircraft and augmented flight information data representing augmented flight information for the another aircraft. The system also includes a processor configured to receive the call sign data and the augmented flight information data, generate signals for displaying a visual indication identifying the other aircraft as a target of the ATC communication, and generate signals for displaying the augmented flight information in alphanumeric form for the other aircraft associated with a displayed aircraft icon.

In another embodiment disclosed herein, a computer storage medium has computer executable instructions stored thereon which, when executed by a processor, cause the processor in a first aircraft to receive a call sign data and an augmented flight information data regarding a second aircraft, generate signals for displaying an aircraft icon associated with the second aircraft indicating the second aircraft is a target of an ATC communication, and generate signals for displaying the augmented flight information in alphanumeric form for the second aircraft associated with the aircraft icon.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
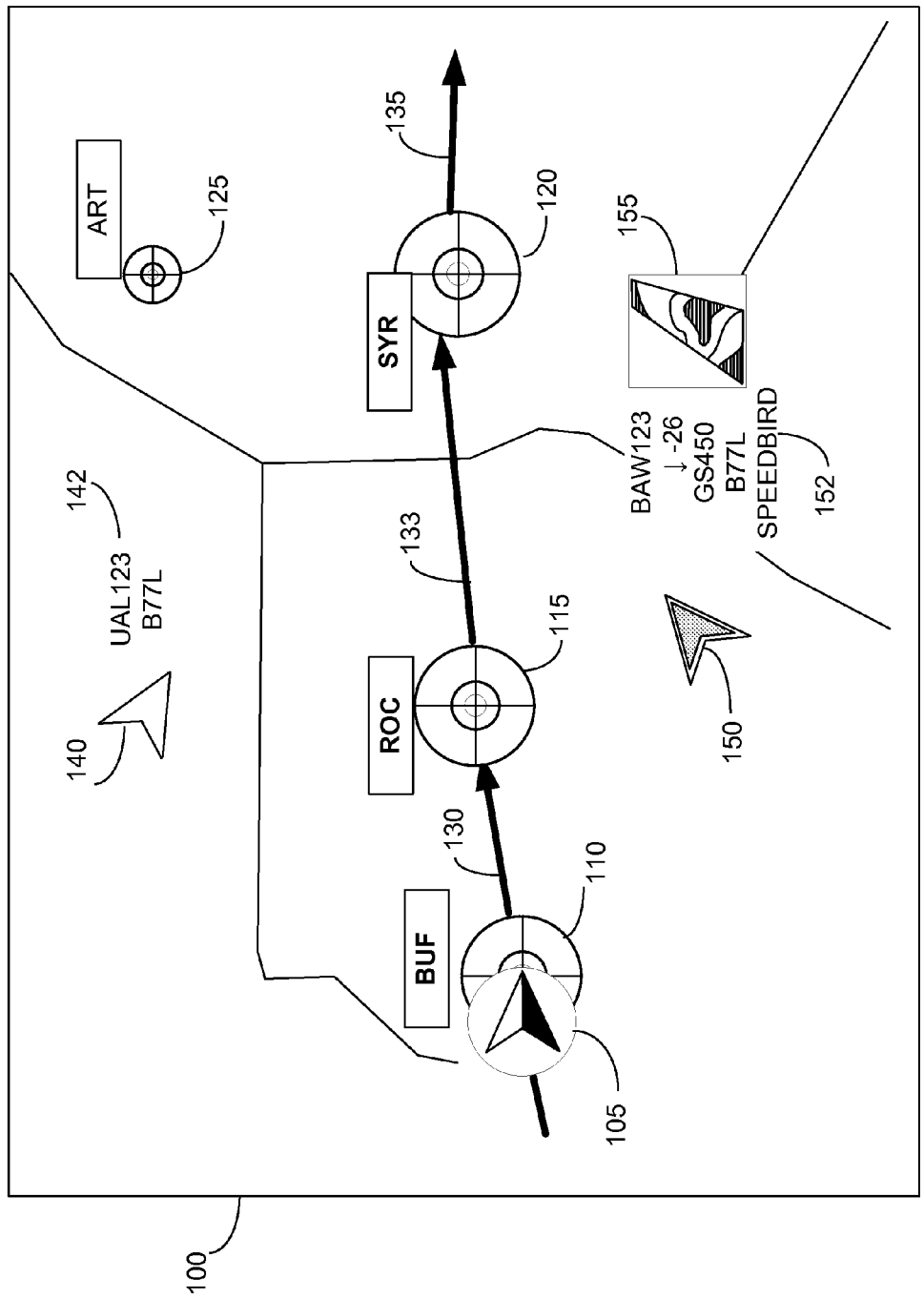
FIG. 1 illustrates one embodiment of a display presenting augmented flight information involving other aircraft according to at least one embodiment disclosed herein.

The following detailed description is directed to a flight information system providing augmented flight information of other surrounding aircraft based on processing voice-based air traffic control ("ATC") communications. ATC communications refers to voice-based communication between a pilot of an aircraft and air traffic control. For purposes of this disclosure, the focus is on ATC-to-aircraft communications for commercial aircraft, although the technology disclosed herein could be adapted for other similar types of communications, including marine communications, private aircraft, aircraft-to ATC, etc. ATC communications are typically broadcasted on a radio frequency received and monitored by several aircraft in the receiving area if the wirelessly broadcasted ATC signal. Consequently, ATC communications is monitored by various aircraft pilots.

To assist commercial pilots in monitoring the location of surrounding aircraft, commercial aircraft may be equipped with a cockpit display of traffic information ("CDTI") that receives broadcast data pertaining to surrounding aircraft and displays this in graphical form on a display to the pilot. The information displayed typically indicates a location of the pilot's aircraft (referred to herein as the "current aircraft") and the location of surrounding aircraft (referred to herein as the "other aircraft" or "another aircraft").

The CDTI does not reflect instructions given to the other aircraft by ATC regarding any change of heading, descent, ascent, etc. for the other aircraft. Thus, pilots generally monitor ATC communications directed to other aircraft to obtain an understanding of where surrounding aircraft is expected to be positioned based on ATC flight instructions. By maintaining a greater situational awareness, pilots can achieve a greater level of safety.

However, constantly monitoring ATC communications can distract or delay the pilot from performing necessary operations in the current aircraft. If the pilot ignores, or does not focus on the ATC communications for the other aircraft, then the pilot may not be cognizant of an instruction provided to another aircraft. Further, because the ATC communications are voice-based, it is not possible for the pilot to review the communications after they have occurred.

ATC communications directed to a pilot usually follows a structured syntax comprising the call sign followed by instructions. The call sign consists of a designator of the flight operator ("designator") and a number, which may be the flight number. For example, the communication may comprise "Speedbird 123, descend to FL320." This means that the aircraft identified by the call sign Speedbird 123 should descend to a flight level of 32,000 feet. Other examples of instructional phrases following a call sign include:
 "Speedbird 123, climb and maintain FL350,"
 "Speedbird 123, cleared direct [XX]" (Where XX Can Be Any Waypoint Or Navigational Aid),
 "Speedbird 123, heading 180" (Degrees),
 "Speedbird 123, turn left 10 degrees," and
 "Speedbird 123, maintain mach 82 or greater."
The various instructional phrases typically alter the vector of the aircraft in some manner, including changing the horizontal or vertical speed, heading, rate of ascent, or rate of descent. In some embodiments, the instructional information may not alter the vector.

The above examples represent augmented flight information, which is information derived from the voice-based ATC communications directed to the other aircraft. Although conveyed by voice, it is possible to integrate this information with the digital flight information received and processed by the CDTI.

One embodiment of providing augmented flight information is shown in FIG. 1. FIG. 1 depicts a display 100 showing a map of the path of the current aircraft that is designated by an aircraft icon 105. The aircraft icon 105 for the current aircraft is unique and in this embodiment is denoted by a half-white/half-black fill-in. Because this icon represents the current aircraft, there is only one such aircraft icon on the display.

According to the illustration in FIG. 1, the current aircraft is approaching a first wayport or navigational aid 110, which is Buffalo, N.Y. ("BUF"). Further, flight path 130 indicates the route to be followed. Flight path 130 leads the current aircraft to the next wayport 115, which is Rochester ("ROC"). After this segment, the flight path 133 leads to another wayport 120, which is Syracuse ("SYR"). From there, the flight path 135 continues. Other wayports may be indicated which are not on the flight path, such as Watertown 125 ("ART").

FIG. 1 also depicts information regarding surrounding aircraft. In this embodiment, FIG. 1 illustrates a neighboring aircraft using an aircraft icon 140, but which does not have the same distinctive fill pattern. This aircraft icon 140 is referred to a conventional aircraft icon since it is generally used to represent other aircraft than the current aircraft. This allows the pilot to readily discern that the aircraft icon 140 refers to another aircraft, and not the current aircraft. It is not unusual for several aircraft icons 140 to be present on the display.

The aircraft icon 140 is accompanied with flight information 142. This flight information is provided adjacent to the aircraft icon in alphanumeric form and indicates the aircraft's call sign and aircraft type. In this case, the call sign is UAL123, which corresponds to United Air Lines Flight 123. Thus, a pilot can readily associate an ATC communication directed to a call sign by visually looking at the display.

FIG. 1 also depicts a second aircraft depicted by another aircraft icon 150, referred to herein as an emphasized aircraft icon. This aircraft icon 150 is indicated in this embodiment with a double line, and may be indicated with a fill-in color that is different from other arrows. A gray fill-in of the aircraft icon 150 in FIG. 1 represents a fill-in color on the display. Those skilled in the art will recognize that different fill-in colors can be assigned to a displayed graphics object on the display. In many embodiments, the displays present color information.

Adjacent to the aircraft icon 150 is augmented flight information 152. This information is augmented relative to the previously discussed flight information 142. The augmented flight information 152 indicates the flight number, which in this embodiment is BAW123. The next line states "↓-26" and this indicates the plane is descending and is currently 2,600 feet below the current aircraft. The next line states "GS450" and indicates the ground speed is 450 knots. The next line states "B77L" and that indicates the specific make and model of the other aircraft, which is a Boeing 777 long range aircraft. The last line of the augmented flight information states the designator, which is "Speedbird." The augmented flight information reinforces the association of the aural call sign designator ("Speedbird") and the visual airline flight designation ("British Airways").

Adjacent to the augmented aircraft information 152 is an insignia 155 representing the logo of the airline operator, as shown on the aircraft tail. This may also be presented in color, which is represented in FIG. 1 using horizontal lines. It is well known that human memory is reinforced by presenting two forms of input, such as text and graphics, and the augmented flight information is more easily recognized and remembered by the pilot when it is indicated using both text and graphics.

The emphasized aircraft icon 150 along with the augmented flight information 152 and carrier insignia 155 is only temporarily displayed after an ATC communication directed to that other aircraft. In the absence of any ATC communications directed to another aircraft, the conventional aircraft icon and the regular flight information would be normally displayed. Upon detecting ATC communications directed to a particular surrounding aircraft, the corresponding aircraft on the display 100 changes from a conventional aircraft icon (see, e.g., 140) to the emphasized aircraft icon (e.g., 150). Further, the flight information is augmented and the insignia 155 is displayed for a short period of time. This duration may be, in one embodiment, in a range of 3-5 seconds, although other time values or ranges can be used.

This arrangement allows the pilot to review the display 100 upon aurally detecting an ATC communication, or shortly thereafter. If the pilot desires to aurally disregard the ATC communication, the ATC communication can be instead visually reviewed shortly by examining the display 100. After the defined duration, the augmented flight information 152, the emphasized aircraft icon 150, and the insignia 155 may fade out on the display 100, or otherwise change to the conventional shaped display elements.

In one embodiment, the display 100 may incorporate a touch-screen or other type of pointing/selecting device. After the emphasized aircraft icon 150 reverts back to the conventional shaped aircraft icon, the pilot can select an aircraft icon. This may be accomplished on a touch-screen display by touching the aircraft icon. Doing so will restore the augmented flight information of the last ATC communication with that aircraft, or a limited history of ATC communication with that aircraft. This allows the pilot to review the ATC communication not only after it was verbally transmitted, but also after the system has temporarily augmented the display.

The indication of which aircraft is the target of an ATC communication ("target aircraft") can be accomplished in various ways. In addition to, or lieu of emphasizing the aircraft icon 150, a variety of other approaches could be used. Various visual indications could be provided to indicate which aircraft is the target of the ATC communication, e.g., the aircraft icon 150 that is the target aircraft could flash, or temporarily change in size. Alternatively, the augmented flight information displayed for the target aircraft could be bolded, increased in size, or changed in color. The insignia or logo of the target aircraft could be displayed. Thus, it is not required in all embodiments that the aircraft icon itself visually change to identify the target aircraft. The above elements may be used individually or in combination.

In other embodiments, the duration for displaying the augmented flight information may vary. The duration could be determined on a system wide parameter, or dynamically determined by other parameters, such as the type and proximity of the other aircraft. In one embodiment, the closer the other aircraft is to the current aircraft, the longer the augmented flight information could be displayed. In other embodiments, other information that what is described above could be provided as augmented flight information.

In other embodiments, the pilot may select a particular flight to review the augmented flight information. The pilot could be presented with a text based log of the ATC communications history for the last three ATC communication instructions. Other information than just vertical and ground speed can be provided, either when the display is initially presented or when the pilot requests to review the ATC communications by selecting an aircraft icon.

Figure 2A:
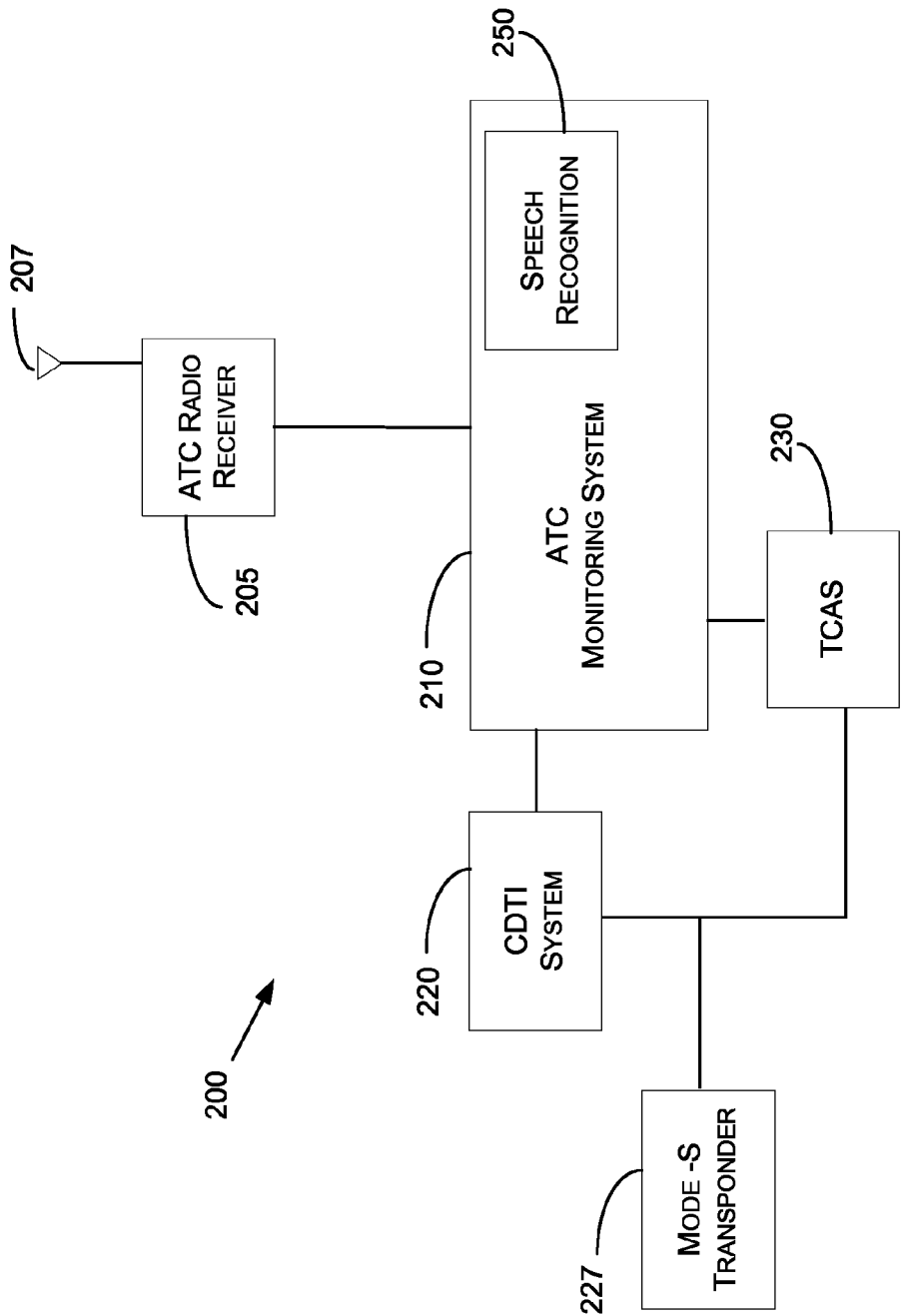
FIGS. 2A-2B illustrate two embodiments of a system providing a display of augmented flight information as disclosed herein.
Figure 2B:
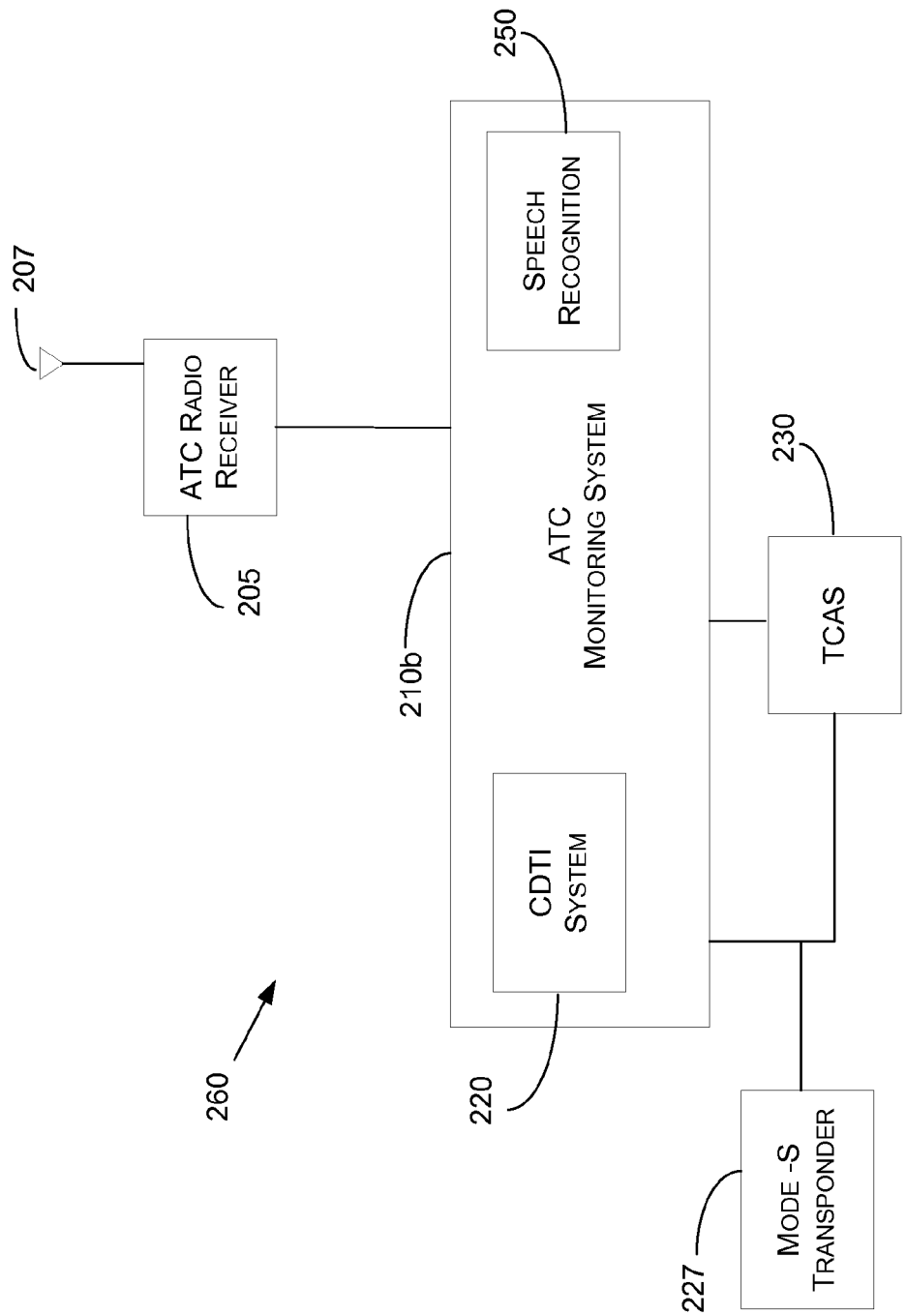

Embodiments of components involved in presenting augmented display information are shown in FIGS. 2A-2B. In FIG. 2A, the wireless transmitted ATC communication is first received using an antenna 207 that provides signals to an ATC radio receiver 205. The output of the ATC radio receiver comprises voice signals, which may be encoded in various forms known to those skilled in the art.

The voice signals are received by the ATC Monitoring System 210, which may incorporate a speech recognition unit 250. In other embodiments, the speech recognition unit 250 may be a distinct module of programming instructions executing on a processor coupled with the ATC Monitoring System 210. The speech recognition system 250 receives the voice signals, and applies the syntax used for ATC communications. The speech recognition system 250 incorporates well known speech recognition algorithms, and is able to return digital message-based data indicating the call sign comprising the designator and flight number, as well as the instructions.

The ATC Monitoring System may provide the augmented flight information to the CDTI System 220 for display. In this embodiment, the CDTI System may have its own processor and may receive data from another processor in the ATC Monitoring System 210. Specifically, the CDTI may receive location of other aircraft by a MODE-S transponder 227. In other embodiment, the CDTI System 220 and the ATC Monitoring System 210 may be integrated, so that the display of information is directly controlled and accomplished by the ATC Monitoring System 210. This embodiment in shown in FIG. 2B, where the functionality of the CDTI System is integrated in the ATC Monitoring System 210b.

In another embodiment, the augmented flight information are also provided to a traffic collision avoidance system ("TCAS") System 230. The TCAS system 230 may also receive location information of other aircraft by data provided by the aforementioned MODE-S transponder 227. Currently, TCAS performs a linear interpolation of aircraft flight vectors, and does not evaluate the impact of flight instructions which only have been aurally conveyed. Thus, the augmented flight information can be analyzed and applied to future aircraft flight vectors that have not yet occurred, but are expected to occur based on the ATC instructions. In other embodiments, the ATC Monitoring System and the TCAS System 230 may be integrated. The ATC Monitoring System could also facilitate the mapping of information between ATC communication using a call sign, and TCAS transponders which use a 24 bit aircraft identifier. The provision of augmented flight information to the TCAS System 230 is not required in every embodiment.

To summarize the operation, in one embodiment the ATC Monitoring System 210 receives voice signals from the ATC Radio Receiver 205 and ascertains the instructions provided to another aircraft using a speech recognition module. This information is integrated with flight information of surrounding aircraft and displayed to the pilot on a display on a temporal basis. Further, upon request, the pilot can review the ATC communications with a selected aircraft, and the ATC Monitoring System 210 can retrieve the information and provide the flight information to the CDTI System.

Figure 3A:
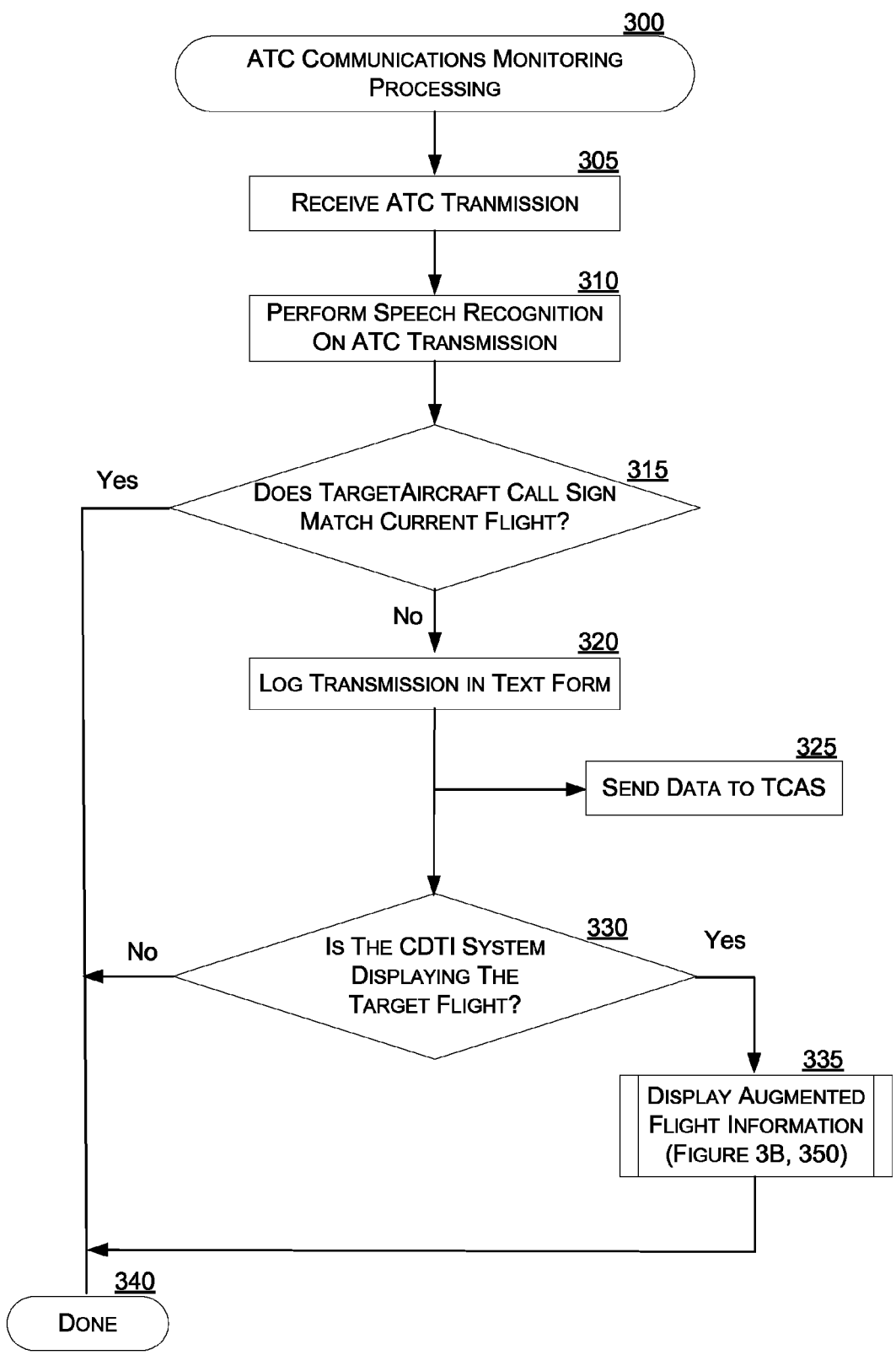
FIGS. 3A-3B illustrate one embodiment of a process flow for providing augmented flight information according to at least one embodiment disclosed herein.
Figure 3B:
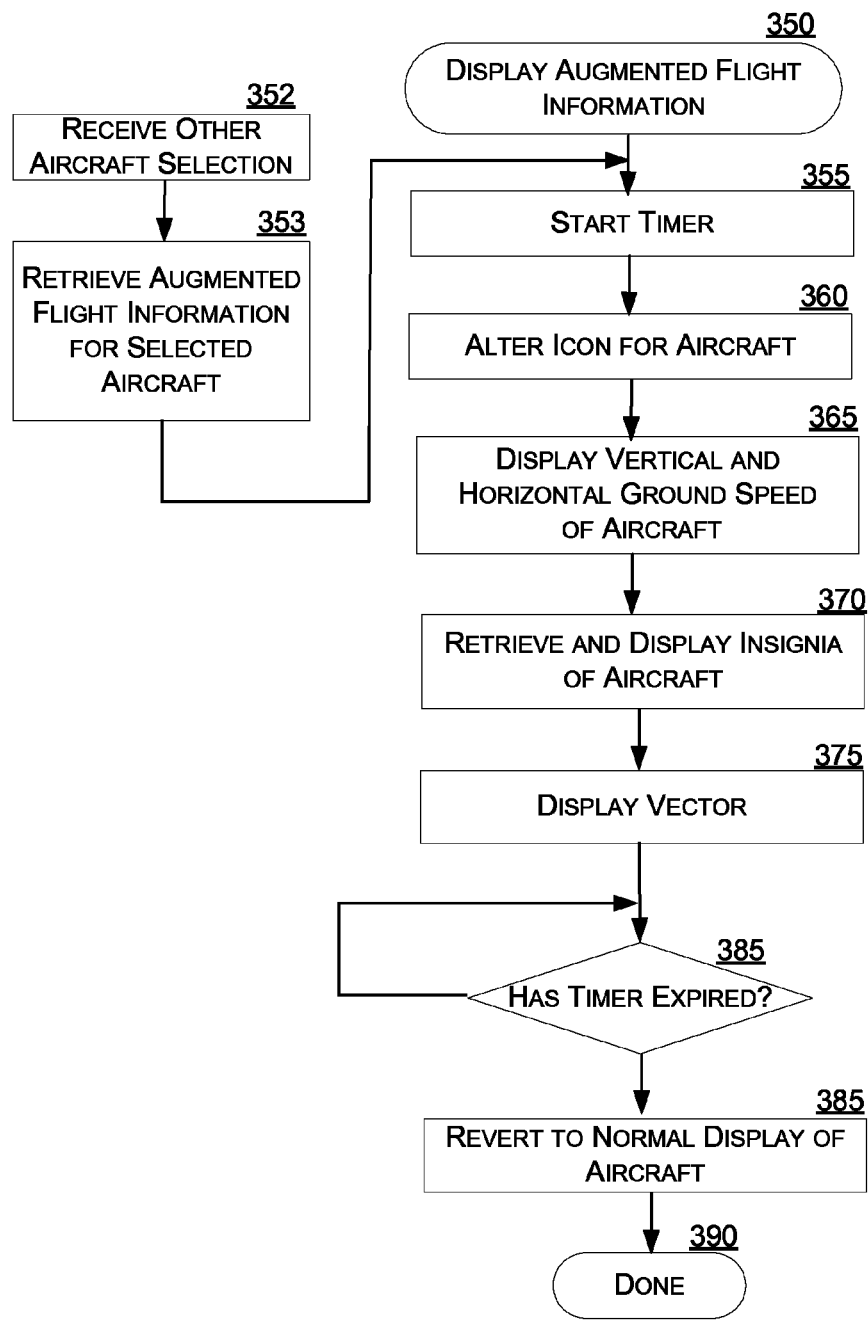

A process flow describing the operations performed to provide the augmented display is illustrated in FIGS. 3A-3B. Turning to FIG. 3A, an ATC Communication Monitoring Process 300 is shown. The process receives ATC communication voice signals in operation 305. These are typically provided from the ATC communications radio receiver, which had wirelessly received the communication. In operation 310, speech recognition is performed on the voice-based ATC communication. The speech recognition processing parses and identifies the call sign and the flight information, including the augmented flight information.

In operation 315, a determination is made whether the call sign is for the current flight or for another aircraft. This can be accomplished by comparing the call sign received in the ATC communication with the call sign of the current aircraft, which is stored in a memory accessed by a processor. If the call sign in the ATC communication is for the current aircraft, then the "yes" branch is followed to operation 340 where the processing is completed. The ATC Monitoring System monitors ATC communications involving other aircraft, not the current aircraft.

Assuming the call sign is not that of the current aircraft, the processing continues to operation 320. There, the system logs the flight information, which in this embodiment includes recording the augmented flight information. The augmented flight information can vary in different embodiments, and may include information such as the ground speed, vertical speed, separation distance, heading change, etc. The augmented flight information is stored so that augmented flight information for a selected flight may be presented to the pilot upon request.

In some embodiments, the flight information derived by the speech recognition processing may be transmitted in operation 325 in parallel to another system or module within the system. For example, the augmented flight information may be transmitted to the TCAS system for avoiding collision. Other systems may receive the information in parallel for other purposes. Transmitting the augmented flight information to other systems is not required in every embodiment.

In operation 330 a determination is made whether the other aircraft corresponds to a currently displayed aircraft on the CDTI screen. If the ATC communication is for another flight that is "off scale" of the CDTI (e.g., it appears off of the screen based on the current scale of the display), then there is no existing flight information to augment on the CDTI screen. In other words, since the aircraft is not shown on the CDTI screen, no enhancement of the image can occur. In one embodiment, an aircraft icon may appear with an arrow pointing to the edge of the display of the aircraft is within a certain limit from being off-scale. Controls can be provided to the pilot allowing the scale or display to be altered. For the remainder of the discussion, it is presumed that if the target aircraft is off-screen, then no enhancement of the image occurs.

In this case, the processing completes in operation 340. Assuming that the augmented information pertains to an aircraft that the CDTI is aware of, then the operation of Display Augmented Flight Information occurs in operation 335.

The Display Augmented Flight Information process 350 is shown in FIG. 3B and begins with operation 355 starting a timer. This timer is the value for which the augmented flight information will be displayed. This value may be a system parameter, or may be determined by the flight information, including the augmented flight information. Thus, the timer for a distant aircraft and a farther aircraft may be different.

In operation 360, the aircraft icon for the other aircraft is altered from the conventional aircraft arrow to the emphasized aircraft arrow. The emphasized aircraft arrow on the display draws attention to the pilot of which aircraft is involved with the ATC communication. The altering of the aircraft icon may occur in different ways and be accompanied by sounds, flashing display elements, etc.

In operation 365 the augmented flight information is displayed. This may comprise different types of information, and in one embodiment includes the ground speed of the other aircraft and/or the vertical speed. In other embodiments, the augmented flight information may comprise other types of information.

In operation 370, an insignia icon is retrieved corresponding to the aircraft operator. This maybe a tail logo, or just the logo without the backdrop of the rudder. Various types of icons may be configured. The insignia is typically displayed adjacent to the augmented flight information.

Figure 5:
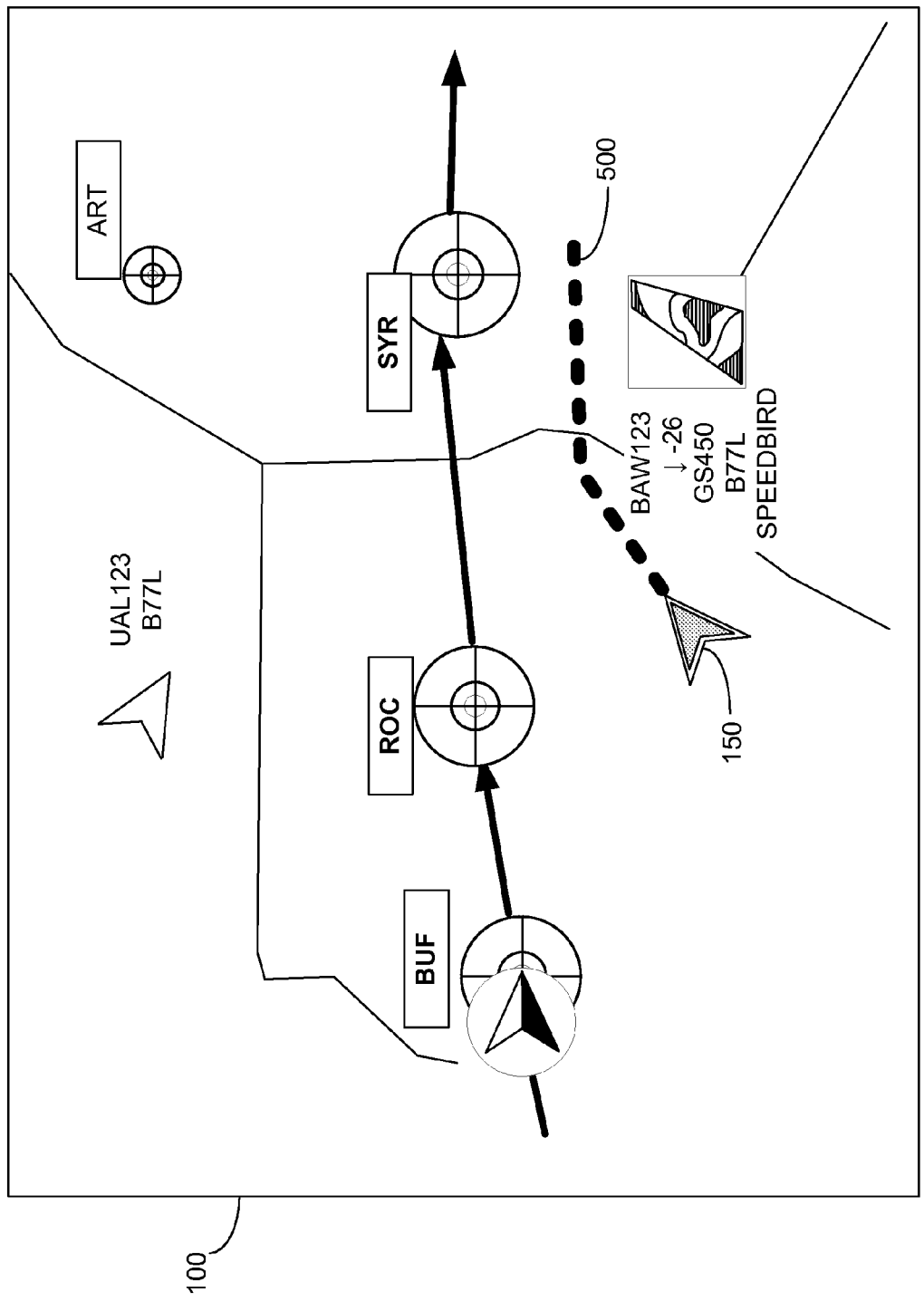
FIG. 5 illustrates an embodiment of a flight course vector depicted for an aircraft according to at least one embodiment disclosed herein.

In operation 375, the display may also show a vector corresponding to an instructed heading change. This can be indicated by a line emanating from the aircraft icon in the appropriate direction. The line does not necessarily have to be a straight line, but can reflect vector changes over time. For example, FIG. 5 illustrates a display 100 where a course vector 500 is shown for the target aircraft identified by the arrow icon 150. This course vector 500 could be indicated by a dashed line, a different color, flashing line, etc. The course vector could be limited to a certain distance from the target aircraft or distance associated with travel for a time period. Other types of vectors can be illustrated corresponding to other instructions.

The augmented flight information is displayed until the timer expires. Thus, in operation 385, the timer is checked. If the timer has not expired, then it is rechecked by looping back to operation 385. If the timer has expired, then in operation 385 the augmented display reverts back to the conventional flight information display based on the conventional aircraft icon and the conventional flight information. The process completes in operation 390.

There is another manner in which the routine 350 can be entered. In this embodiment, the pilot selects an aircraft icon for another aircraft indication on the display 100 in operation 352. In response, the augmented flight information stored in the ATC System is retrieved in operation 353. Then the process continues in operation 355 with the starting of the timer. The remaining aspects of the process 350 are unchanged. This alternative entry into the display augmented flight information process allows a pilot to review the augmented flight information for a selected aircraft in cases where the pilot needs to review ATC communications for the other aircraft.

In another embodiment, the system could print, instead of displaying, a list of the previous ATC communication instructions for the selected aircraft. This would allow potentially providing a detailed history of the augmented information that could not be presented on the display.

Figure 4:
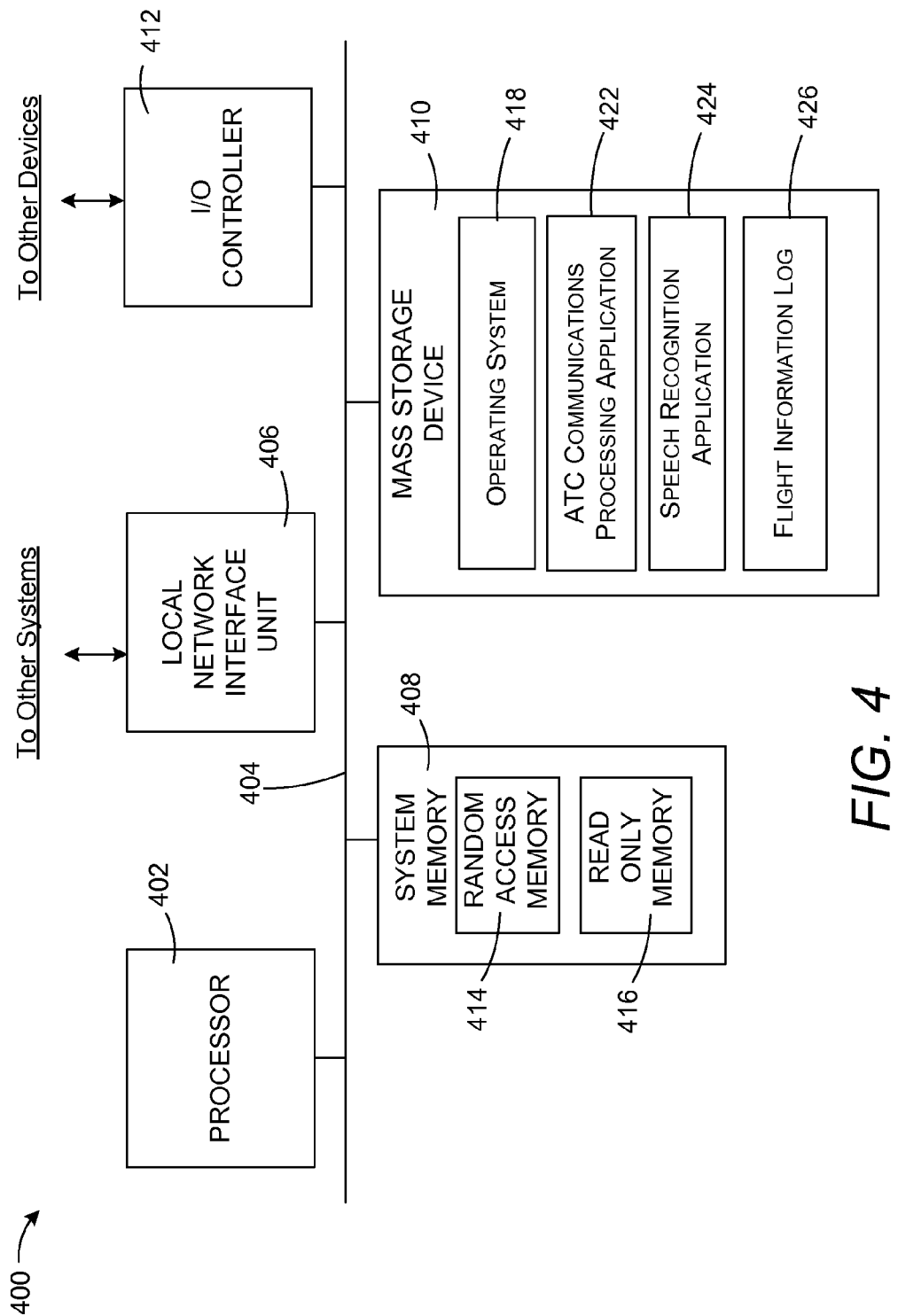
FIG. 4 illustrates an embodiment of a computer architecture for a system for providing augmented flight information according to at least one embodiment disclosed herein.

One embodiment for a computing architecture for a device capable of executing the operations and software components described herein is shown in FIG. 4. The computer architecture shown in FIG. 4 illustrates a conventional desktop, laptop, or server computer that may be utilized to execute any aspect of the methods presented herein. The computer 400 may be a part of existing flight information processing system such as the CDTI or an electronic flight bag ("EFB") or a dedicated system for providing augmented flight information.

The computer architecture shown in FIG. 4 may include a central processing unit 402 ("CPU", a.k.a. a processor), a system memory 408 including a random access memory 414 ("RAM") and a read-only memory ("ROM") 416, and a system bus 404 that couples the memory to the CPU 402. A basic input/output system containing the basic routines for transferring information between elements within the computer 400, such as during startup, is stored in the ROM 416. The computer 400 further includes a mass storage device 410 for storing an operating system 418, and the ATC communication processing application 422, and other related data, such as the flight information log 426. Other applications may be stored, such as the voice recognition application 424.

The mass storage device 410 is connected to the CPU 402 through a mass storage controller (not shown) connected to the bus 404. The mass storage device 410 and its associated computer-readable media provide non-volatile storage for the central processing unit 402. Although the description of computer-readable media contained herein refers to a mass storage device, such as a hard disk or CD-ROM drive, it should be appreciated by those skilled in the art that computer-readable media can be any available computer storage media that can be utilized by the computer 400.

By way of example, and not limitation, computer-storage media may include volatile and non-volatile, removable and non-removable media implemented in any method or technology for non-transient storage of information such as computer-readable instructions, data structures, program modules or other data. For example, computer-storage media includes, but is not limited to, RAM, ROM, EPROM, EEPROM, flash memory or other solid state memory technology, CD-ROM, digital versatile disks (DVD), HD-DVD, BLU-RAY, or other optical storage, magnetic cassettes, magnetic tape, magnetic disk storage or other magnetic storage devices, or any other medium which can be used to store the desired information and which can be utilized by the computer 400 that does not encompass transitory signals.

According to various embodiments, the computer 400 may operate in a local networked environment using logical connections to other aircraft system computers in the aircraft through a local area network controller unit 406. This may allow data to be sent to or received from other components, such as the ATC radio receiver 205 or TCAS system 230. In addition, the input/output controller 412 can be used in addition with, or in lieu of, the local network interface unit 406.

For example, if the system 400 is a mobile tablet computing device, the local network interface unit may be based on using a wireless access protocol (e.g., Wi-Fi) for receiving status indication data. The computer 400 may also include an input/output controller 412 for receiving and processing input from a number of other devices, including a keyboard, mouse, or electronic stylus (not shown in FIG. 4). Similarly, an input/output controller may provide output to a display screen, a printer, or other type of output device (also not shown in FIG. 4).

Finally, the computer 400 also comprises in one embodiment a display/touch screen 415. This is used to present information to the user, as well as to receive touch input signals associated with a function key or other input presented to the user as part of the graphical user interface.

A number of program modules and data files may be stored in the mass storage device 410 and RAM 414 of the computer 400, including an operating system 418 suitable for controlling the operation of a networked desktop, laptop, or server computer. The mass storage device 410 and RAM 414 may also store one or more program modules. In particular, the mass storage device 410 and the RAM 414 may store the ATC communication processing application 422 that is operative to perform the operations described above. The mass storage device 410 and the RAM 414 may also store other types of program modules. For example, the mass storage device 410 may also store a flight information data log 426 comprising the augmented flight information for various other aircraft. This could be indexed by call sign and time of receipt to allow easy retrieval of the flight information for an indicated aircraft.

The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. A method for displaying augmented flight information on a display comprising:
  receiving air traffic controller ("ATC") communication at a first aircraft regarding a second aircraft, the ATC communication including augmented flight information comprising a change to a vector of the second aircraft;
  ascertaining the augmented flight information in the ATC communication for the second aircraft;
  determining the second aircraft is not the first aircraft receiving the ATC communication; and
  in response to determining the second aircraft is not the first aircraft, displaying at least a part of the augmented flight information on the display along with a visual indication identifying the second aircraft is a target aircraft of the ATC communication.

2. The method of claim 1, wherein providing a visual indication identifying the second aircraft as a target aircraft of the ATC communication comprises altering on the display a line, a line color, or a fill-in color of an emphasized aircraft icon representing the second aircraft.

3. The method of claim 1, further comprising:
  displaying the emphasized aircraft icon associated with the second aircraft on the display for a duration; and
  displaying the augmented flight information for the duration.

4. The method of claim 1, wherein determining the second aircraft is not the first aircraft receiving the ATC communication is accomplished by comparing a first call sign associated with the first aircraft stored in a memory of a processing system with a second call sign of a second aircraft indicated in the ATC communication.

5. The method of claim 2, wherein the augmented flight information includes one from the group of: a change in heading of the second aircraft, a ground speed indication of the second aircraft, a relative flight level of the second aircraft, and a relative airspeed of the second aircraft.

6. The method of claim 2, wherein ascertaining the augmented flight information in the ATC communication involves processing the ATC communication indicating speech with a speech recognition module to ascertain the augmented flight information.

7. The method of claim of claim 5, further comprising the operation of:
  providing the augmented flight information to a TCAS system.

8. The method of claim 6, wherein the second aircraft is identified by a call sign comprising a designator and a flight number.

9. The method of claim 2, further comprising:
  displaying a conventional aircraft icon representing the second aircraft on the display;
  receiving an input selecting the conventional aircraft icon;
  displaying the emphasized aircraft icon representing the second aircraft on the display to a pilot of the first aircraft after the duration; and
  displaying the augmented flight information for a second duration.

10. The method of claim 2, further comprising:
  displaying an insignia on the display associated with the second aircraft.

11. A system for displaying augmented flight information comprising:
  a radio receiver configured to receive wirelessly communicated air traffic control ("ATC") communication in an aircraft, the radio receiver providing voice-based ATC communication signals;

a speech processing module configured to receive the voice-based ATC communication signals and to providing call sign data indicating a call sign for another aircraft and augmented flight information data representing augmented flight information for the another aircraft; and a processor configured to
receive the call sign data and the augmented flight information data,
generate signals for displaying a visual indication identifying the another aircraft as a target of the ATC communication, and
generate signals for displaying the augmented flight information in alphanumeric form for the another aircraft associated with a displayed aircraft icon.

12. The system for displaying augmented flight information of claim 11, wherein the augmented flight information in alphanumeric form further comprise indicating a ground speed of the another aircraft.

13. The system for displaying augmented flight information of claim 12, further comprising:
a display controlled by a second processor configured to receive the signals for displaying the augmented information in alphanumeric form.

14. The system for displaying augmented flight information of claim 13, wherein the second processor is further configured to:
display the augmented flight information in alphanumeric form for a duration.

15. The system for displaying augmented flight information of claim 13, wherein the call sign comprises a designator and a flight number, and the processor is further configured to compare the designator and the flight number with a second designator and second flight number stored in a memory.

16. A computer readable medium storing instructions which when executed cause a processor in a first aircraft to:
receive a call sign data and an augmented flight information data regarding a second aircraft;
generate signals for displaying an aircraft icon associated with the second aircraft indicating the second aircraft is a target of an ATC communication; and
generate signals for displaying the augmented flight information in alphanumeric form for the second aircraft associated with the aircraft icon.

17. The computer readable medium of claim 16, further storing instructions which when executed cause the processor in the first aircraft to:
generate a signal for displaying an insignia associated with the call sign of the second aircraft.

18. The computer readable medium of claim 16, further storing instructions which when executed cause the processor in the first aircraft to:
display the augmented flight information for a limited duration.

19. The computer readable medium of claim 18, further storing instructions which when executed cause the processor in the first aircraft to:
receive input indication a selection of the aircraft icon; and
generate a second signal for displaying the augmented flight information in alphanumeric form for the second aircraft associated with the aircraft icon.

* * * * *